(12) United States Patent
Kendall et al.

(10) Patent No.: US 9,795,010 B2
(45) Date of Patent: Oct. 17, 2017

(54) SENSOR SYSTEM FOR REFRIGERATOR

(71) Applicant: Whirlpool Corporation, Benton Harbor, MI (US)

(72) Inventors: James W. Kendall, Mt. Prospect, IL (US); Kevin Edward Licht, Evansville, IN (US); Jill C. Snyder, Anderson, SC (US); Michael D. Kincaid, Bridgman, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 15/460,291

(22) Filed: Mar. 16, 2017

(65) Prior Publication Data

US 2017/0188436 A1 Jun. 29, 2017

Related U.S. Application Data

(63) Continuation of application No. 13/657,052, filed on Oct. 22, 2012, now Pat. No. 9,642,214.

(51) Int. Cl.
| | |
|---|---|
| H05B 37/00 | (2006.01) |
| H05B 37/02 | (2006.01) |
| F21V 33/00 | (2006.01) |
| F25D 27/00 | (2006.01) |
| F25D 23/02 | (2006.01) |

(Continued)

(52) U.S. Cl.
CPC ..... *H05B 37/0227* (2013.01); *F21V 33/0044* (2013.01); *F25D 23/028* (2013.01); *F25D 25/025* (2013.01); *F25D 27/005* (2013.01); *H05B 37/0218* (2013.01); *H05B 37/0281* (2013.01); *F21W 2131/305* (2013.01); *F25D 2327/001* (2013.01); *F25D 2700/04* (2013.01); *F25D 2700/06* (2013.01)

(58) Field of Classification Search
CPC ........... F25D 2400/06; F25D 2400/361; F25D 27/005; F25D 2327/001; F25D 2400/36; F25D 2500/04; F25D 2600/02; F25D 2700/04; F25D 29/00; F25D 29/005
See application file for complete search history.

(56) References Cited

U.S. PATENT DOCUMENTS

| | | | |
|---|---|---|---|
| 5,016,146 | A | 5/1991 | Kaspar et al. |
| 5,836,669 | A | 11/1998 | Hed |

(Continued)

OTHER PUBLICATIONS

Capacitive Switch Scan, AN2233a, Cypress Application Note, Revision B, Apr. 14, 2005, Author: Dennis Sequine.

*Primary Examiner* — Monica C King
(74) *Attorney, Agent, or Firm* — Nyemaster Goode P.C.

(57) ABSTRACT

An interactive appliance is provided. The interactive appliance includes at least a housing, and an intelligent control disposed within the housing. One or more lighting devices are electrically connected to the intelligent control, as are one or more sensors. The sensors provide sensor data for the interactive appliance. The intelligent control is configured to alter operation of at least one of the one or more lighting devices based on data provided by the sensor to provide interactive feedback to a user of the interactive appliance. The feedback can include altering light intensity, color, consistency, or the like depending on the sensor data. Furthermore, the lighting device can be placed on a surface, such as an exterior surface of the housing of the appliance, or can be disposed within an interior portion of the appliance.

20 Claims, 7 Drawing Sheets

(51) Int. Cl.
*F25D 25/02* (2006.01)
*F21W 131/305* (2006.01)

(56) References Cited

U.S. PATENT DOCUMENTS

| | | | |
|---|---|---|---|
| 5,986,265 A | 11/1999 | Kim et al. | |
| 6,483,695 B1 | 11/2002 | Hartstein | |
| 6,804,974 B1 | 10/2004 | Voglewede et al. | |
| 7,030,860 B1 | 4/2006 | Hsu et al. | |
| 7,119,887 B2 | 10/2006 | Mizuo et al. | |
| 7,201,005 B2 | 4/2007 | Voglewede et al. | |
| 7,411,195 B2 | 8/2008 | Narasako et al. | |
| 7,543,453 B2 | 6/2009 | Boarman et al. | |
| 7,568,358 B2 | 8/2009 | Wetekamp | |
| 7,762,665 B2 | 7/2010 | Vertegaal et al. | |
| 7,832,224 B2 | 11/2010 | Roo et al. | |
| 7,878,022 B2 | 2/2011 | Kwon | |
| 7,917,583 B2 | 3/2011 | Angiolillo et al. | |
| 7,959,313 B2 | 6/2011 | Park et al. | |
| 8,109,301 B1 | 2/2012 | Denise | |
| 8,423,194 B2 | 4/2013 | Besore et al. | |
| 2002/0056806 A1 | 5/2002 | Bechtel et al. | |
| 2006/0087640 A1 | 4/2006 | Yamaguchi | |
| 2008/0156008 A1 | 7/2008 | Richmond et al. | |
| 2008/0164224 A1 | 7/2008 | McCoy et al. | |
| 2008/0164796 A1 | 7/2008 | McCoy et al. | |
| 2008/0165282 A1 | 7/2008 | Marcy et al. | |
| 2008/0165474 A1 | 7/2008 | McCoy et al. | |
| 2008/0165509 A1 | 7/2008 | Kendall et al. | |
| 2008/0166895 A1 | 7/2008 | McCoy et al. | |
| 2008/0166915 A1 | 7/2008 | Kendall et al. | |
| 2009/0090120 A1 | 4/2009 | Roo et al. | |
| 2009/0183796 A1 | 7/2009 | Chase et al. | |
| 2010/0101254 A1 | 4/2010 | Besore et al. | |
| 2010/0155415 A1 | 6/2010 | Ashrafzadeh et al. | |
| 2012/0185086 A1 | 7/2012 | Khatchadourian et al. | |
| 2013/0050069 A1 | 2/2013 | Ota | |
| 2013/0104586 A1 | 5/2013 | Krause et al. | |

SENSOR SYSTEM FOR REFRIGERATOR

RELATED APPLICATIONS

The present application is a continuation of U.S. patent application Ser. No. 13/657,052 entitled "SENSOR SYSTEM FOR REFRIGERATOR" filed on Oct. 22, 2012, the entire contents of which is hereby incorporated by reference.

FIELD OF THE INVENTION

The present invention relates generally to the field of appliances. More particularly, but not exclusively, the invention relates to a lighting and sensor system of a refrigerator.

BACKGROUND OF THE INVENTION

Appliances, such as refrigerators, may be equipped with many different lights. The lights may, for example, aid individuals in seeing what is held in the compartments of the refrigerator. On refrigerators having water, ice, or other liquid dispensing systems, the lights may aid in the alignment of a container, such as a cup, with the dispensing spout so as to prevent spills or other mishaps. Furthermore, the dispensing units may have a user interface that includes lights that can be turned on and off to designate buttons that alter the dispenser or refrigerator.

Many consumers prefer to keep their dispenser lights off, including lights designating the dispenser well or cavity. Turning off the lights may help to save energy. In addition, the lights may create an unwanted glow that can be an annoyance to the consumer. However, when other lights are off, it is difficult for consumers to see where to put their cup or container in relation to the dispenser and well. It may also be difficult to see where the buttons are that would turn on a light for the dispenser.

Furthermore, many refrigerators include interior lights that turn on automatically when the door or doors are opened to provide access to the interior. The lights may slowly gain brightness, or they may go directly from off to a full brightness level. In either case, the resulting light is rather bright. The light must be sufficient to be able to show all that is included in the interior of the cabinet. As such, the bright light can be too much for a consumer to handle when opening the door or doors in the dark. The light can be blinding and cause headaches, temporary blindness, or other problems.

Other lights are found on or in the refrigerator. These lights may be a user interface found on the refrigerator that needs to be engaged to light up. The interface includes a "sleep mode" that turns off the lights of the interface. A consumer must press a button to turn on the interface. The button may also change the settings of the refrigerator. Furthermore, when the interface is in "sleep mode", the consumer may not be able to know what setting a dispenser is in, e.g. cubed ice, crushed ice, cold water, hot water, etc. Other lights may provide an alert or aid in viewing the refrigerator, but they also need to be pressed in order to illuminate.

SUMMARY OF THE INVENTION

Therefore, it is principal object, feature, and/or advantage of the present invention to provide an apparatus that overcomes the deficiencies in the art.

It is also an object, feature, and/or advantage of the present invention to provide a lighting system including proximity sensors to automatically turn lights on upon approach to the refrigerator or dispenser.

It is a further object, feature, and/or advantage of the present invention to provide a refrigerator lighting system that includes a mode wherein the lights perform a function.

It is another object, feature, and/or advantage of the present invention to provide a dispenser that includes lights and sensors to automatically light up upon approach.

It is yet another object, feature, and/or advantage of the present invention to provide a refrigerator dispenser that includes a dimmer button for the interior lighting of the refrigerator.

It is still a further object, feature, and/or advantage of the present invention to provide a passive lighting system for a refrigerator.

It is yet a further object, feature, and/or advantage of the present invention to provide a lighting system for a refrigerator using capacitive sense or infrared and visible light proximity sensors.

These and/or other objects, features, and advantages of the present invention will be apparent to those skilled in the art. The present invention is not to be limited to or by these objects, features and advantages. No single embodiment need provide each and every object, feature, or advantage.

According to one aspect of the present invention, an interactive appliance is provided. The interactive appliance includes an appliance housing, and an intelligent control disposed within the appliance housing. At least one lighting device is electrically connected to the intelligent control. At least one sensor is electrically connected to the intelligent control for providing sensor data. The intelligent control is configured to alter operation of the at least one lighting device based on the sensor data to provide interactive feedback to a user of the interactive appliance.

The lighting device can be integrated into a surface of the housing of the interactive appliance, such as to an exterior area, handle, or interior area of the appliance. The appliance is interactive in that it provides feedback to a user based upon an action of the user. For example, the appliance may include a lighting device that illuminates as a user approaches the appliance, that changes color after a preset amount of time or change in environment, that changes intensity based upon a change in the environment, that provides information, such as temperature or location, or that provides other types of information to the user based upon current data obtained by the sensor. The intelligent control can also determine a predicted usage of the interactive appliance based on the sensor data, with the operation of the lighting device being altered based upon such predicted usage.

According to another embodiment of the present invention, an interactive refrigerator is provided. The refrigerator includes a refrigerator cabinet, and a door for providing access to a compartment within the refrigerator cabinet. At least one lighting device and sensor are electrically connected to an intelligent control. The intelligent control is configured to alter operation of the at least one lighting device based on the sensor data to provide interactive feedback to a user of the interactive refrigerator.

DETAILED DESCRIPTION OF THE PREFERRED EMBODIMENTS

Figure 1:
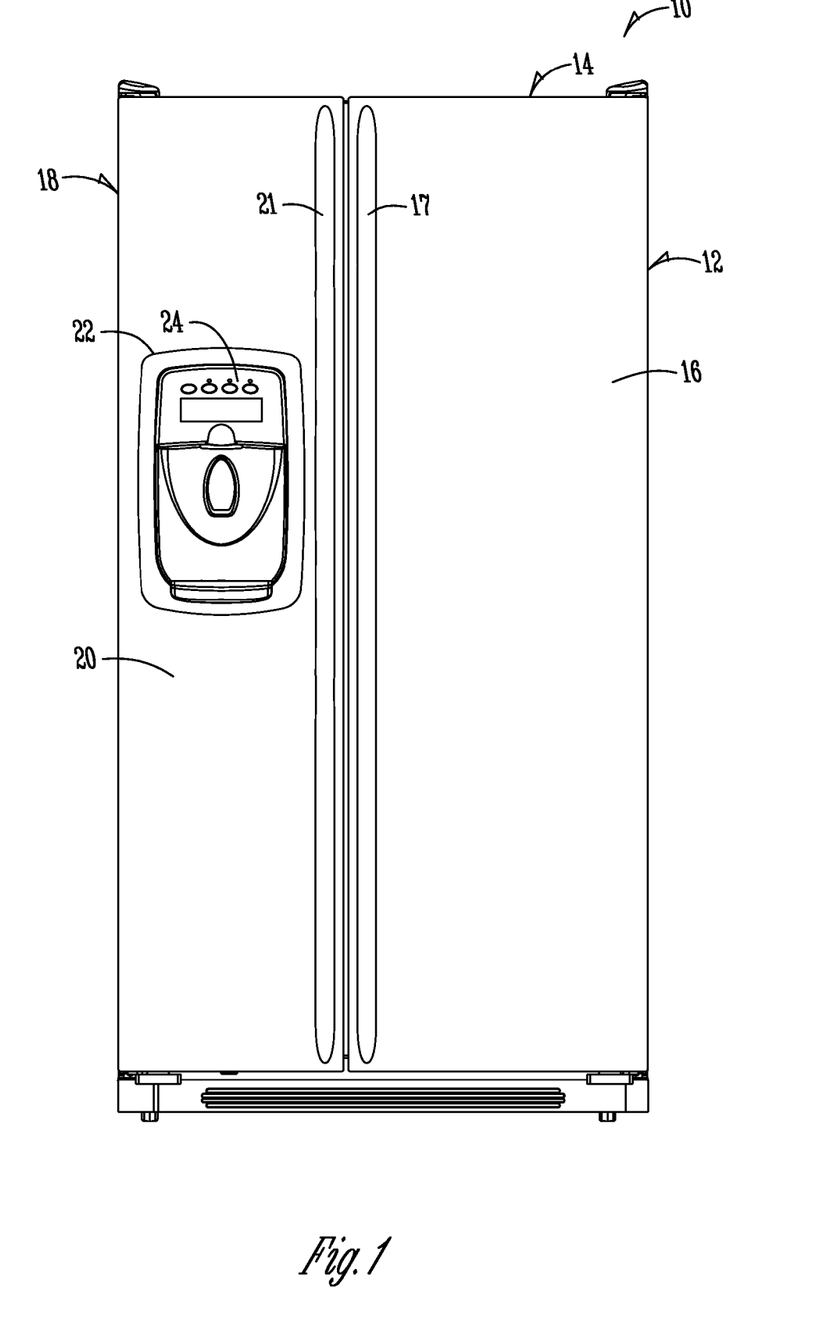
FIG. 1 is a depiction of one type of refrigerator used with the present invention.
Figure 7:
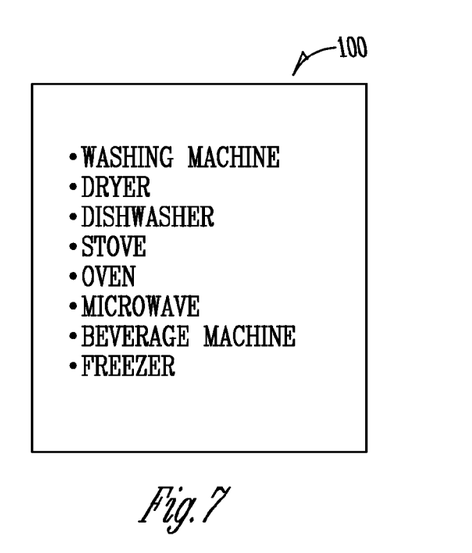
FIG. 7 is a schematic of a non-exhaustive list of appliances used with the present invention.

FIG. 1 shows a refrigerator 10 according to the present invention. The refrigerator 10 is one example of an appliance that can incorporate the embodiments of the present invention. However, other appliances 100 are also included as part of the present invention. For example, as shown in FIG. 7, other appliances covered by the present invention include, but are not limited to, washing machines, dryers, dishwashers, stoves, ovens, microwaves, beverage machines/dispensers (i.e. coffee makers), freezers, and the like. The present invention is not to be limited to the appliances listed, and is intended to include generally any appliance having a housing 101, intelligent control 102, lighting device 104, and sensor 106 for use with providing interactive feedback to a user of the device.

The refrigerator 10 includes a refrigerator cabinet 12. The refrigerator cabinet may be separated into a fresh food compartment 14 and a freezer compartment 18. While the refrigerator 10 of FIG. 1 shows a French door or side-by-side configuration of the refrigerator 10, it should be appreciated that the present invention can be used with refrigerators of any configuration. A fresh food door 16 includes a fresh food door handle 17. The fresh food door 16 and/or handle 17 may also be considered exterior surfaces of the refrigerator 10. However, it is contemplated that generally any outer surface (surface accessible without opening or manipulating the appliance) of an appliance be considered an exterior surface. The fresh food door 16 and handle 17 may be opened to provide access to the fresh food compartment 14. Furthermore, there is provided a freezer door 20 including a freezer door handle 21, which provides access to the interior of the freezer compartment 18.

Positioned on the freezer door 20 and operatively connected to the cabinet 12 is a dispenser 22. The dispenser 22 may be a water dispenser, ice dispenser, other beverage dispenser, or some combination thereof. Therefore, the dispenser 22 includes a dispenser user interface 24 to control aspects of the dispenser 22. For example, the user interface 24 may include buttons or other settings corresponding to the water flow, ice making and ice flow, beverage designation, or some combination thereof. Furthermore, the user interface 24 may include controls for the interior of the fresh food compartment 14 and/or the freezer compartment 18. These controls may include lighting controls, temperature settings, power set control, and the like.

Furthermore, the refrigerator 10 includes a plurality of lights on the exterior of the refrigerator 10 and dispenser 22. The refrigerator 10 may also include a badge or label designating the brand and/or type of refrigerator. This badge (not shown) may include a light that glows in the dark or turns on in the dark such that the type of refrigerator as shown, the light may also be used as a beacon to show the location of the refrigerator. Furthermore, the refrigerator 10 may include lights at the top and/or bottom of the refrigerator 10, as will be discussed in greater detail below. The dispenser 22 may include lights corresponding to the dispenser well, water flow, and user interface 24. The lights, which may be light emitting diodes (LEDs), liquid crystal display (LCD) lights, or any other lights, aid in a display of the dispenser 22.

Figure 2:
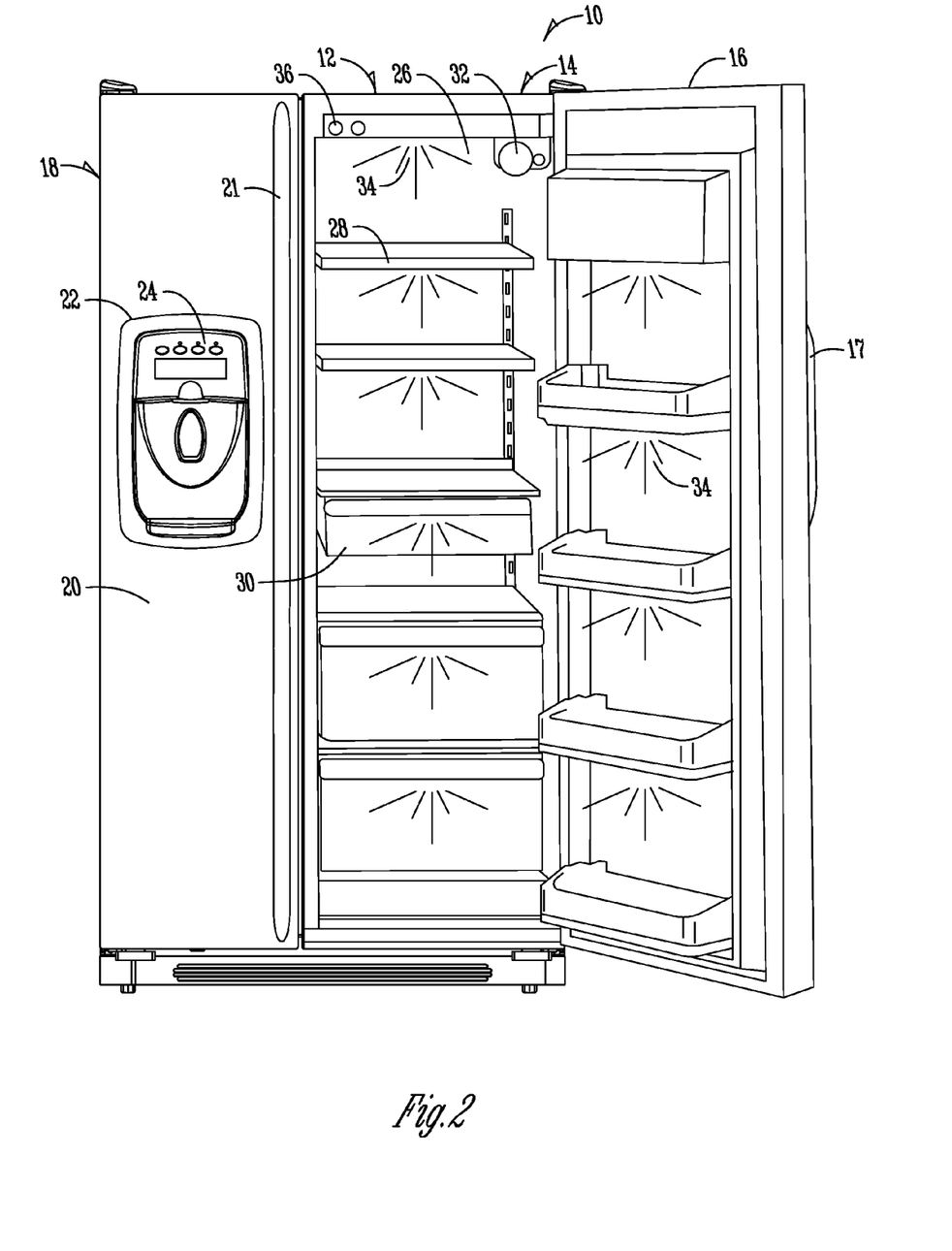
FIG. 2 is a view of the refrigerator of claim 1 with a door opened.

FIG. 2 is a view of the refrigerator 10 of claim 1 with the fresh food door 16 in an open position. As shown, the fresh food door 16 is hingeably connected to the cabinet 12 such that the door 16 is able to rotate in a generally circular manner to provide access to the interior of the fresh food compartment 14. The interior 26 of the fresh food compartment 14 includes a plurality of shelves 28 and drawers 30. The configuration of these shelves 28 and drawers 30 in both the interior 26 of the fresh food compartment 14 and on the interior of the fresh food door 16 may include any configuration, and need not be limited to the configuration shown in FIG. 2. Furthermore, as shown in FIG. 2, the fresh food compartment 14 may include a filter 32 and setting display 36. The filter 32 is operatively connected to the dispenser and ice maker such that the water is filtered before passing through the dispenser and ice maker. The setting display 36 is configured to show the status of the refrigerator 10, e.g., cooling, stable, or warming.

Also shown in FIG. 2 is a plurality of interior lights 34. The interior lights can be placed throughout the interior 26 of the fresh food compartment 14. It is noted that the location of the light in FIG. 2 are for exemplary purposes, and are not to be limiting of the present invention. However, it is appreciated that the refrigerator 10 includes enough light to illuminate the interior 26 of the fresh food compartment 14 when the fresh food compartment door 16 is open. It should also be noted that the lights turn off when the fresh food compartment door 16 is closed. The interior lights may include lights within the shelves and may also include functions. The lights within the shelves and function of lights in the interior 26 of the fresh food compartment 14 are operatively connected to sensors, such as proximity and environmental sensors. Therefore, the lights perform a function according to the status of the sensor and the surrounding area. For instance, it is appreciated that the interior lights will go from an off position to an on position upon opening of the fresh food compartment door 16. Other functions will be discussed as well.

Figure 3A:
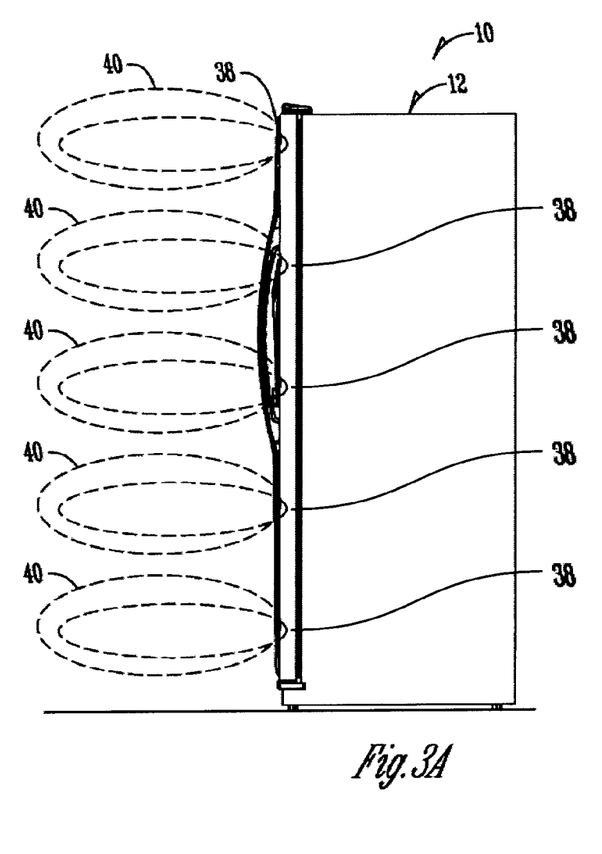
FIG. 3A is a side view of a refrigerator showing an aspect of the present invention.
Figure 3B:
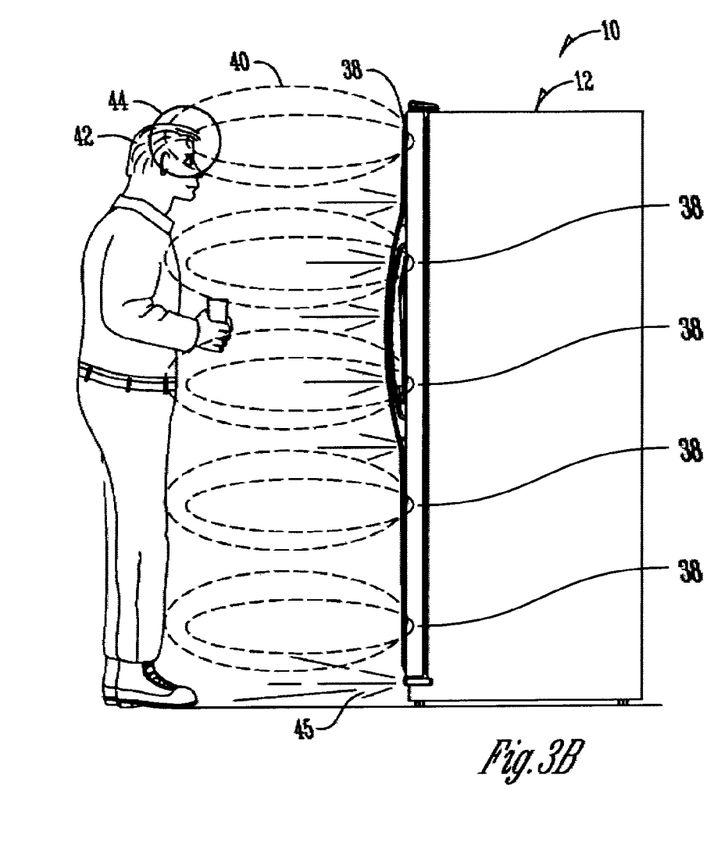
FIG. 3B is a view similar to FIG. 3A, but showing a person approaching the refrigerator.

FIGS. 3A and 3B show an aspect of the sensor system according to the present invention. As mentioned previously, the refrigerator 10 includes a plurality of sensors operatively connected to the lights of the refrigerator. Furthermore, the sensors may be proximity sensors, which detect an object within a certain range of the proximity sensors. The proximity sensors may be capacitive sense sensors or may be light proximity sensors, which detect both infrared and visible light and use the combination of the visible and infrared light to detect movement within a predetermined area adjacent the sensors. For example, FIG. 3A includes a refrigerator 10 having a plurality of sensors 38. The sensors 38 of FIGS. 3A and 3B are capacitive sense sensors that provide a field 40 that protrudes away from the front face of the refrigerator 10. The field is generally a loop, which passes outwardly and back towards the refrigerator 10. FIG. 3A shows a plurality of sensors placed on the doors or cabinet of the refrigerator 10 such that a plurality of fields 40 is created.

FIG. 3B shows a consumer 42 approaching the refrigerator 10. As the consumer 42 approaches a predetermined distance away from the refrigerator 10, the consumer 42 will pass within the sensor field 40. This will cause a disruption 44 in the sensor field 40. This disruption in the field 40 will alert the sensors 38 that a consumer 42 is approaching, and the sensors 38 will interact with an intelligent control 102 to perform a programmed function. For instance, as shown in FIG. 3B, when the consumer 42 disrupts the sensor field 40, the sensors 38 are programmed to illuminate a light 45 near the bottom of the refrigerator 10. The light 45 illuminating when the consumer 42 approaches will aid the consumer 42 to see the general boundaries of the refrigerator 10 without having to turn on any additional lights in the room in which the refrigerator 10 is located. Furthermore, other lights, such as dispenser lights and user interface lights may also light up once the consumer 42 has disrupted the sensor field 40. While FIGS. 3A and 3B show sensors 38 using a capacitive sense loop, it should be appreciated that the same result will occur when the sensors 38 use visible and infrared light to determine that a consumer or other object is within the predetermined distance from the refrigerator 10.

Figure 4:
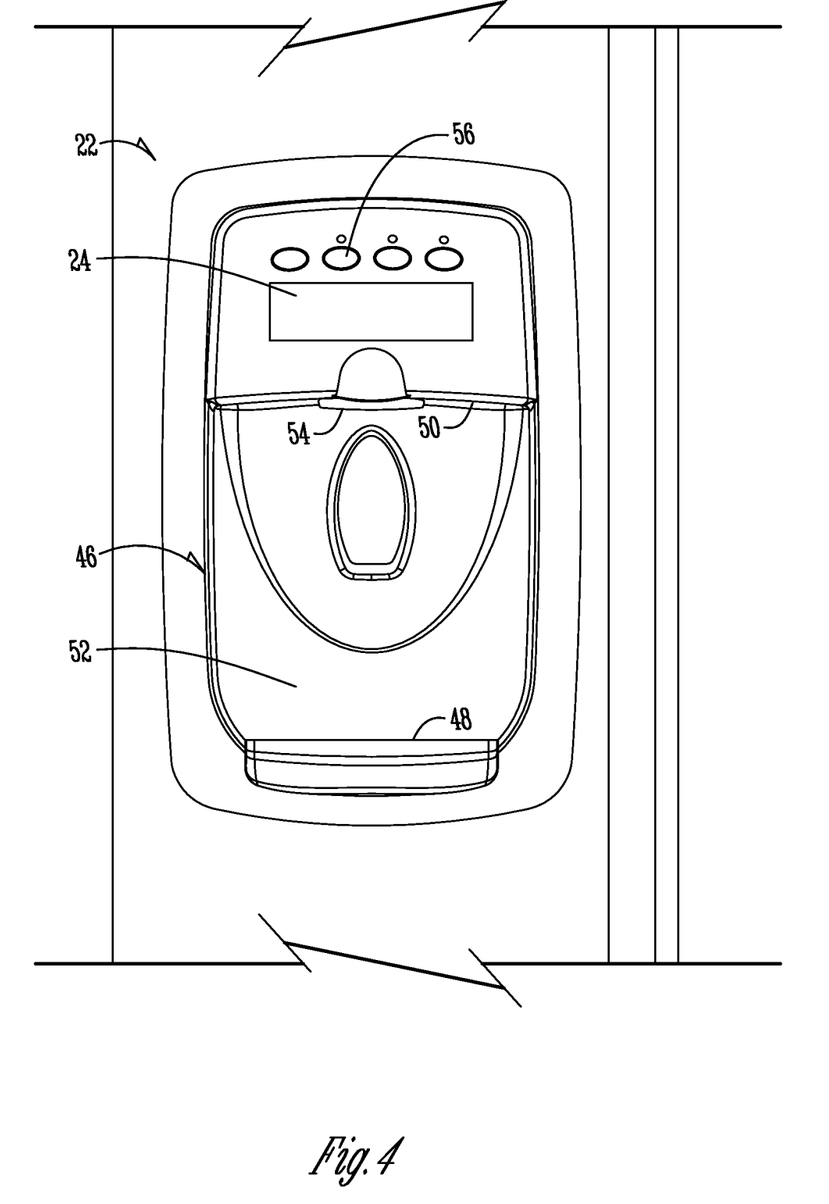
FIG. 4 is a front view of a dispenser mounted on the refrigerator.

FIG. 4 is a front view of a dispenser 22 mounted on the refrigerator 10. In FIG. 4, the dispenser 22 is mounted on the freezer door 20 and is operatively connected to the refrigerator 10. As noted above, the dispenser 22 may be positioned anywhere on the refrigerator 10. The dispenser 22 includes a dispenser user interface 24. The dispenser 22 also includes a dispenser well 46 comprising a bottom wall 48, top wall 50, and side wall 52. The dispenser 22 also includes a dispenser opening 54 through the top wall 50 such that the dispenser opening 54 provides a port through which water, ice, or other beverages are passed through. Furthermore, the bottom wall 48 may include a trough or drain for receiving spillage. The dispenser 22 also includes an activation button in the side wall 52 to activate the dispenser 22. A plurality of lights is included throughout the dispenser 22. For example, lights may be mounted within the side wall 52, top wall 50, and/or dispenser opening 54. The lights illuminate the dispenser well 46 such that a user is able to correctly place a container within the well 46 without guessing or having to turn on any additional lighting in the room.

Furthermore, the lighting in the dispenser opening 54 may include colored lighting that corresponds to the temperature of the beverage dispensing from the dispenser 22, as well as a target light shining directly towards the bottom wall 48 to designate the direction of the flow of the beverage. It is noted that the dispenser well 46 need not require all lights mentioned. Furthermore, the dispenser user interface 24 includes a plurality of lights designating a plurality of controls for the dispenser 22 and/or refrigerator 10. The dispenser user interface 24 may include a dimmer switch 56. The dimmer switch 56 can control the amount of illumination of the interior light of the fresh food compartment 14 and/or freezer compartment 18. For example, when opening a refrigerator door in a dark room, the light may be too blinding to a consumer. Therefore, the dimmer switch 56 may be pressed such that the lighting of the interior of the refrigerator 10 be dimmed upon opening of either the fresh food compartment door 16 or the freezer compartment door 20, such that a consumer may not experience a bright light when opening the doors. The dimmer switch 56 may be preprogrammed or programmable by the consumer to control the amount of dimming.

Figure 5A:
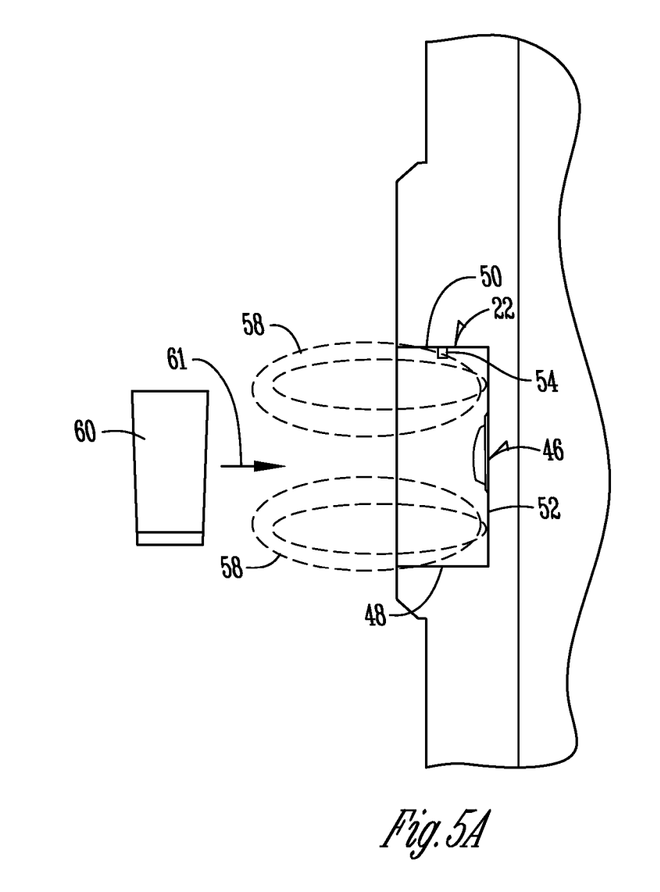
FIGS. 5A and 5B are side views of a dispenser of a refrigerator showing a container approaching the dispenser.
Figure 5B:
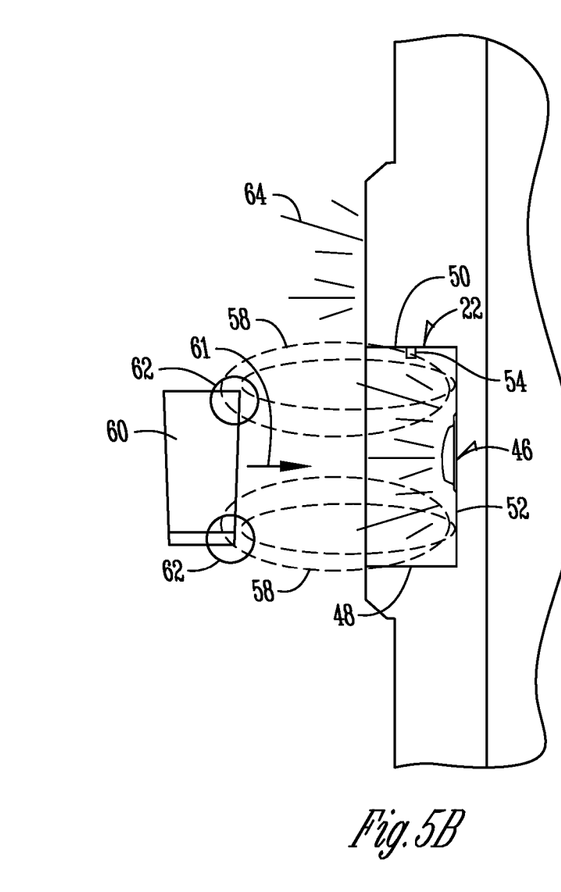

FIGS. 5A and 5B are side views of a dispenser 22 according to one aspect of the present invention. The dispenser 22 may be a dispenser shown in FIG. 4 of the refrigerator 10. Therefore, the dispenser 22 includes all the components, including the dispenser well 46. The dispenser 22 includes a plurality of sensors 38, which may be proximity sensors or environment sensors. For example, the proximity sensors can create a field 58 by the use of capacitive sense sensors or infrared and visible light sensors. This is shown in FIGS. 5A and 5B. The configuration is similar to that shown in FIGS. 3A and 3B. The sensors 38 create a field 58 extending a predetermined distance from the dispenser 22. As a container 60, such as a cup, approaches the dispenser 22 to be filled with a beverage, ice, or the like, it will be approaching in the direction generally shown by the arrow 61. Once the container 60 has disrupted the field 58 or the sensors 38, the sensors 38, which are operatively connected to a plurality of user interface lighting, will work with an intelligent control to illuminate the lighting of the dispenser 22. The illumination may include lighting within the dispenser well 46 and the user interface 24. However, both the well 46 and user interface 24 need not be illuminated upon disruption 62 of the fields 58. The illumination of the lights includes but is not limited to an illumination of the side wall of the dispenser well 46, illumination of the user interface 24, illumination of a target light extending from the dispenser opening, and the like. It is noted that not all illuminations are required.

As noted, the dispenser 22 may also include environmental sensors. The environmental sensors work to determine the status of the illumination of the environment surrounding the dispenser 22, upon which the sensors, which are operatively connected to an intelligent control in the lighting system, respond accordingly. For example, when the refrigerator 10 is in a room, which becomes dark, the environmental sensors detect the lack of light, and they illuminate lights of the dispenser 22 accordingly. For example, the side wall 52 or other component of the dispenser well 46 may become illuminated when the surrounding room of the dispenser 22 falls beyond a predetermined standard of illumination or brightness.

Figure 6:
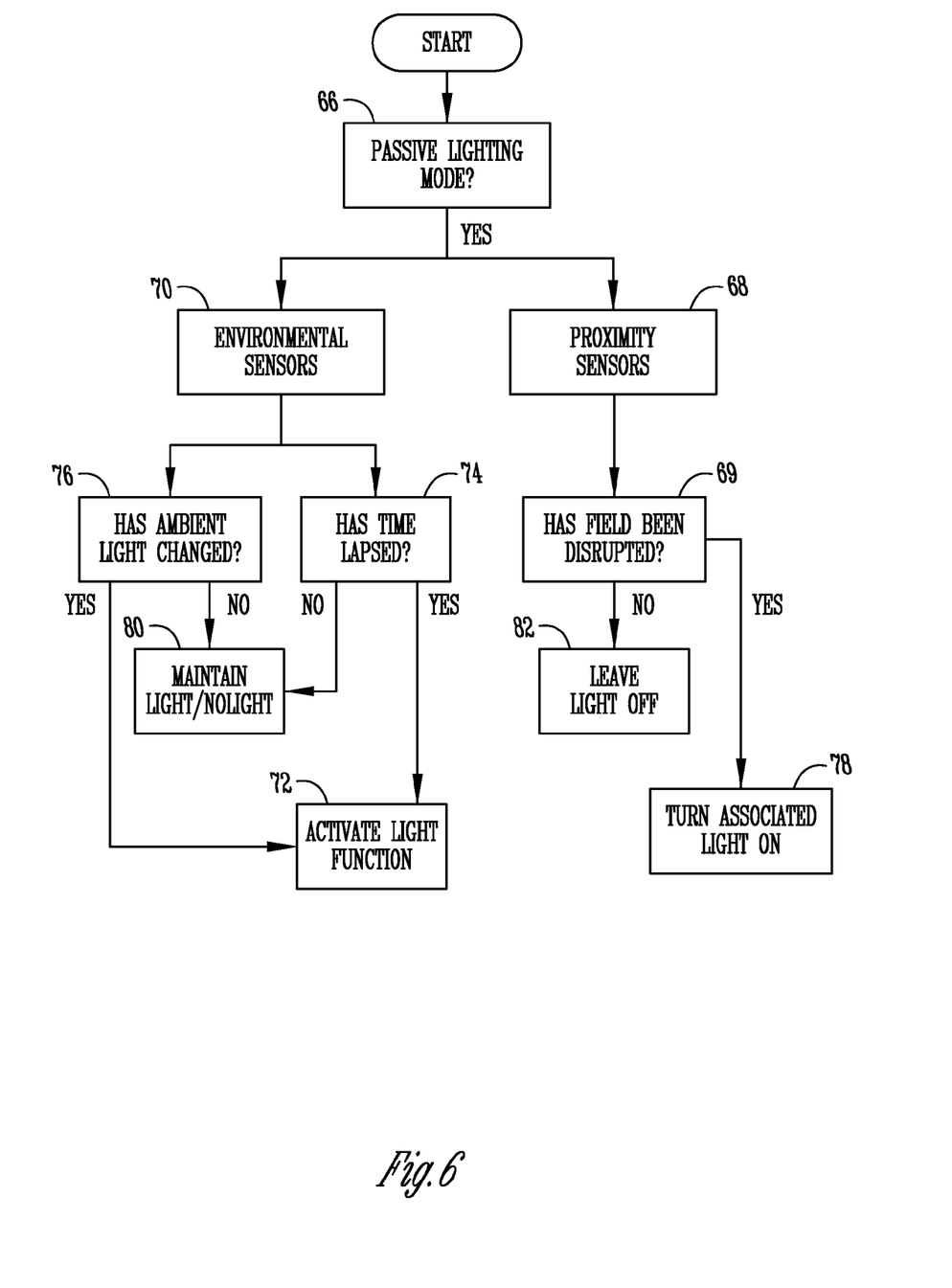
FIG. 6 is a flowchart for the lighting system of the refrigerator according to an aspect of the present invention.

FIG. 6 is a flow chart for the lighting system 66 of the refrigerator 10 according to an aspect of the present invention. FIG. 6 shows a general process shown for a passive lighting system 66. The passive lighting system 66 is described such that a user need not access or press any buttons to cause the lighting system to perform a function or turn on or off. The passive lighting system 66 includes both proximity sensors 68 and environmental sensors 70, which are operatively connected to an intelligent control in the refrigerator 10. The sensors are also operatively connected to a plurality of lights throughout the exterior and interior of the refrigerator 10. For the proximity sensors 68, a field is emitted from the sensors by use of capacitive sense sensors or infrared and visible light sensors. The capacitive sense sensors create a loop field. The visible and infrared light sensors detect both visible and infrared light at a predetermined distance from the sensors to detect if there any been a change within the area adjacent the sensor. Therefore, both the capacitive sense sensors and the visible and infrared light sensors create a field. The sensors determine whether a field has been disrupted, as is shown in the step 69 of FIG. 6. If no field has been disrupted, the sensors do nothing. Thus, they either leave lights on which have been on, or leave lights off which have been off. However, if the proximity sensors 68 have determined a disruption or a change in the field, the sensors communicate with the intelligent control and the light to turn the light on or off. This example has been shown in at least FIGS. 3B and 5B. Furthermore, the sensors can work to perform a function of the lights. For example, if a dispenser sensor detects a certain type of container, the sensor can direct the light of just the dispenser 22 to turn on. The sensors can also detect when a consumer has reached into a shelf or drawer of the refrigerator, and can turn on a light specified to the area accordingly.

FIG. 6 also shows environmental sensors 70, which also may be proximity sensors 68. The environmental sensors 70 determine the status of the environment around the sensors. This may include a disruption of a field, or also may include the determination of the amount of illumination around the environmental sensors 70. For example, according to the box 76, it is determined whether ambient light around the refrigerator 10 and sensors has changed. If ambient light has not changed, then step 80 states that the sensors do nothing. However, if the ambient light has changed, the sensors operate with the intelligent control to cause the lights to activate a function, as shown in step 72. The function may be to illuminate a certain aspect of the refrigerator 10. For example, if the lighting in the room of the refrigerator 10 is turned off and it is dark, the environmental sensors 70 may work to turn specific lights of the refrigerator 10 on, such as its dispenser lights or other lights.

The environmental sensors 70 also may include time sensors, which activate a function if a specified amount of time has lapsed. The step 74 asks the question whether enough time has lapsed for a specified sensor. If yes, the sensor communicates with the intelligent control and the light to have the light perform a function. For example, as stated above, the interior lights of the refrigerator 10 will illuminate upon opening of one of the refrigerator doors. If the door is left open for a specified amount of time, the sensor of passive lighting system 66 may activate the function of flickering or pulsing the lights on and off to alert the consumer that the temperature of the interior of the refrigerator 10 is rising. The sensors may also detect that one of the refrigerator doors has remained open and not shut all the way. In this instance, and after a specified amount of time has lapsed, the sensor may direct the light on a door handle to illuminate, alerting a consumer that the door is not fully closed. Other functions may include changing the color of the light after a specified amount of time has passed, changing the lighting of a filter system to alert that the filter needs to be replaced, lighting or unlighting a second user interface 24 located on or in the refrigerator 10, or providing lighting that there has been an increase in the amount of power or energy used by the refrigerator 10. It should be noted that the examples of the functions given are not limiting, in other functions of a passive lighting system 66 are considered to be part of the invention.

The lights of the lighting system may include light emitting diodes (LEDs), liquid crystal display (LCD) lights, or the like. The present invention is not limiting to the type of lights used for any of the aspects of the lighting system. Therefore, it is appreciated that the lighting choice will be determined based on the use and intended output of the lights. Furthermore, the number and type of sensors used for the lighting system of the present invention is also not limited. For example, while it is mentioned that the proximity sensors include capacitive sense sensors and infrared and visible light detecting sensors, it should be appreciated that other type of proximity sensors be included with the present invention. For example, photocell sensors, radar sensors, sonar sensors, inductive sensors, magnetic sensors, and the like are all intended to be included as part of the present invention.

Thus, an interactive appliance 100, in this case an interactive refrigerator 10, has been described. Although the present invention contemplates various types of interactive appliances, the refrigerator is an example of an appliance that receives particular benefits from the interactive feedback aspect of the invention. In operation, the interactive refrigerator 10 provides feedback to a user of the refrigerator 10 based upon sensor data obtained by a sensor or sensors connected to an intelligent control in the refrigerator 10. The refrigerator may be considered interactive in the sense that it responds to an action of a user or to a change in the environment around the refrigerator 10. For example, the sensor(s) continuously provides sensor data. The sensor data is continuously received by the intelligent control to determine if an operation of a light or lighting device needs to be altered. For example, the sensor data could indicate that a user is approaching the refrigerator. Therefore, the intelligent control can provide feedback by turning on one or more lights, or increasing light intensity, to aid in providing the feedback of showing details of the refrigerator. Once the user has passed or walked away from the refrigerator, the continuously provided sensor data can let the intelligent control know to turn off or lower the illumination of the light, which provides feedback that no one is near the refrigerator. The interactions are not limited to user/refrigerator, however, and can also include feedback provided do the change in the environment at or adjacent to the refrigerator.

Thus, the interactive refrigerator provides feedback without necessarily relying on a display. Moreover, the interactive refrigerator expands the user interface of the refrigerator by allowing movements of the user, position of the user, and status of physical components to be used as inputs, and allowing different lighting conditions, including lighting conditions in different zones, to provide feedback to the user. Thus, illumination or lighting may be used for multiple, separate purposes, such as to illuminate an area and also to provide feedback to a user on a condition or set of conditions, or to direct the user to physically engage a portion of the refrigerator to correct a problem, such as by illuminating a portion of the refrigerator.

Other examples of interaction include alerting a user that a door or drawer has not fully closed by flashing lights or changing the color of lights, providing predictive usage of the interactive refrigerator by illuminating a light or area (such as a dispenser or drawer) based upon a movement or environmental condition, changing the color of a light based upon a choice made by a user (i.e., changing the color of a dispenser light based upon the temperature of liquid selected by the user), or the like. Other examples of feedback that can be provided by the refrigerator to the user that are obvious to those skilled in the art are also considered to be a part of the present invention.

Figure 8:
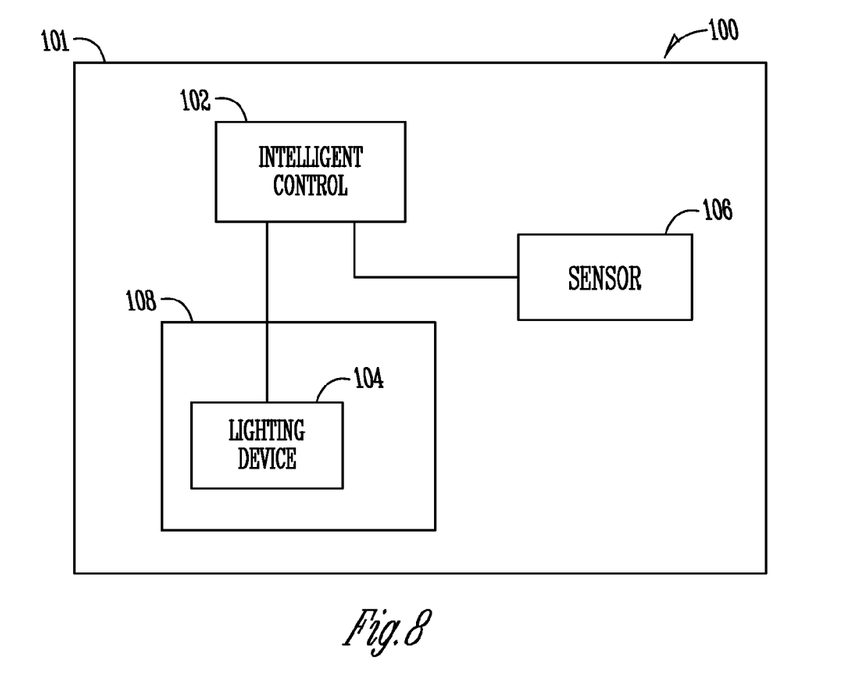
FIG. 8 is a block diagram of an appliance incorporating an embodiment of the present invention.

FIG. 8 is a block diagram showing a schematic of an embodiment of the present invention used with an appliance 100. Examples of such appliances 100 are given in FIGS. 1-7. According to the diagram of FIG. 8, an appliance 100 includes a housing 101. An intelligent control 102 is included with the appliance 100. A lighting device (or devices) 104 is electrically connected to the intelligent control 102. The lighting device may be positioned on a surface 108 of the appliance housing 101. Furthermore, the surface 108 may be an exterior surface, such as a handle or door. Other exterior surfaces are also included, and the present invention also contemplates the lighting device positioned in the interior of the appliance 100, such as on an interior surface of the housing 101. However, the exact location of the lighting device is not limiting to the present invention, and the present invention contemplates that the lighting device 104 can be positioned generally anywhere relative to the appliance 100. A sensor 106 is also electrically connected to the intelligent control 102. The sensor is configured to alter operation of the lighting device(s) 104 based on sensor data to provide interactive feedback to a user of the appliance 100, thus making the appliance 100 an interactive appliance. Such operations may include, but are not limited to, altering lighting intensity, altering light color, altering the consistency of the light output, or the like.

The above described embodiments of the present invention are for illustrative purposes only and do not limit the scope of the claimed invention. The invention is only to be limited by the claims appended hereto. Therefore, other changes not mentioned explicitly are intended to be included as part of the scope of the invention. This may include the location of the lights, sensors, user interfaces, dispensers, and the like. It is also appreciated that the lighting system of the present invention is not limited to side-by-side or French door refrigerators, and is intended to be used with any type of refrigerator.

What is claimed is:

1. An appliance comprising:
   an appliance housing having an exterior and a handle;
   a plurality of lighting devices electrically and interactively connected to at least one proximity sensor that acquires sensor data within a sensor field that extends a distance away from the exterior of the appliance housing;
   wherein each of the plurality of lighting devices perform a programmed function and are responsive to a disruption of the sensor field; and
   wherein a disruption in the sensor field activates at least one of the plurality of lighting devices proximate the bottom of the appliance and the at least one of the plurality of lighting devices proximate the bottom of the appliance illuminates a general boundary area proximate the bottom of the appliance;
   wherein the plurality of lighting devices are integrated into a user facing surface of the exterior of the appliance; and
   wherein the at least one of the plurality of lighting devices is positioned on a surface of the handle.

2. The appliance of claim 1, wherein at least one of the plurality of lighting devices is positioned on the surface of the handle to illuminate the handle and wherein a disruption in the sensor field of at least one proximity sensor activates the at least one of the plurality of lighting devices positioned on the surface of the handle.

3. The appliance of claim 1, wherein the plurality of lighting devices are on the exterior of the appliance and an interior of the appliance and at least one lighting device is on an exterior surface of a handle.

4. The appliance of claim 3, wherein the plurality of lighting devices further include at least one dispenser illuminating lighting device that, when activated, illuminates a dispenser on the exterior of the appliance and the at least one proximity sensor is associated with the dispenser to determine if a container is proximate the dispenser.

5. The appliance of claim 3, wherein the plurality of lighting devices are a plurality of interior lighting devices that have an alterable intensity and the appliance further comprises at least one time sensor and a dimmer switch and the alterable intensity is changed based upon input from either the at least one time sensor or the dimmer switch.

6. The appliance of claim 1, wherein illumination of at least one of the plurality of lighting devices is an altered light color based upon a disruption of the sensor field.

7. The appliance of claim 1, wherein a light intensity and visible light color of the plurality of lighting devices is altered based upon input from the at least one proximity sensor over time.

8. The appliance of claim 5, wherein the alterable intensity is changed based upon both the input from the at least one time sensor and the input from the dimmer switch.

9. The appliance of claim 1, wherein an operation of the plurality of lighting devices comprises a predicted usage of the appliance based on the sensor data to provide feedback to a user based upon the predicted usage.

10. A refrigerator comprising:
    an appliance housing having an exterior surface and a door having a handle and having at least one door proximity sensor and at least one interior proximity sensor;
    a refrigerator bottom lighting device and a handle lighting device connected to a proximity sensor that acquires sensor data within a sensor field that extends a distance away from the exterior of the appliance housing;
    wherein the refrigerator bottom lighting device and the handle lighting device perform a programmed function and is responsive to a disruption of the sensor field; and
    wherein a disruption in the sensor field activates the refrigerator bottom lighting device and the refrigerator bottom lighting device proximate the bottom of the refrigerator illuminates a general boundary area proximate the bottom of the refrigerator;
    wherein the refrigerator bottom lighting device and the handle lighting device are integrated into a user facing surface of the exterior of the refrigerator; and
    wherein the handle lighting device is positioned on a surface of the handle.

11. The refrigerator of claim 10, wherein the at least one door proximity sensor is positioned on the exterior surface of the door, each door proximity sensor associated with an exterior sensor field loop that extends outward and back toward the door proximity sensor, wherein disruption of the exterior sensor field loop activates at least one exterior appliance lighting device that illuminates an area proximate the refrigerator.

12. The refrigerator of claim 11, wherein the at least one interior proximity sensor senses motion within an interior volume of the refrigerator and a plurality of interior lighting devices wherein an interior lighting device is associated with each defined subvolume with the interior of the refrigerator such that movement sensed by the at least one interior proximity sensor alters a lighting intensity of the defined subvolume.

13. The refrigerator of claim 10, wherein the at least one interior proximity sensor senses motion within an interior volume of the refrigerator and a plurality of interior lighting devices wherein an interior lighting device is associated with each defined subvolume with the interior of the refrigerator such that movement sensed by the at least one interior proximity sensor alters a lighting intensity of the defined subvolume.

14. A refrigerator comprising:
    a refrigerator cabinet having an exterior surface and a dispenser on the exterior surface that dispenses water and ice;
    a door for providing access to a compartment within the refrigerator cabinet;
    at least one dispenser lighting device associated with the dispenser and operably connected to at least one dispenser proximity sensor associated with and positioned on a dispenser well wall of the dispenser where the at least one dispenser proximity sensor has a loop sensor field associated therewith that extends away from and through a recessed dispensing area of the dispenser and wherein the at least one dispenser lighting device illuminates the recessed dispensing area of the dispenser upon a disruption in the sensor field;

at least one door proximity sensor positioned on the exterior surface of the door, the at least one door proximity sensor having an associated exterior sensor field loop that extends outward and back toward the at least one door proximity sensor, wherein a disruption of the exterior sensor field loop activates at least one exterior refrigerator lighting device that illuminates an area proximate the refrigerator; and at least one interior proximity sensor wherein each of the at least one interior proximity sensor senses motion within an interior volume of the refrigerator and a plurality of interior lighting devices wherein an interior lighting device is associated with each defined subvolume with the interior of the refrigerator such that movement sensed by the at least one interior proximity sensor alters a lighting intensity of the defined subvolume.

15. The refrigerator of claim 14 further comprising a handle lighting device and a door opened time sensor that senses an amount of time a door having a handle associated with the handle lighting device has been open where, after a period of time has passed the door opened time sensor causes the handle lighting device to illuminate the handle.

16. The refrigerator of claim 15, wherein the refrigerator further comprises an environmental sensor configured to sense ambient light in a room where the refrigerator is located.

17. The refrigerator of claim 16, wherein the environmental sensor, the at least one dispenser proximity sensor, the at least one door proximity sensor, the at least one interior proximity sensor, and the door opened time sensor are positioned on a surface chosen from the group consisting of a liner surface, a shelf surface, a door surface, an interior crisper surface, a refrigerator cabinet surface, a dispenser well surface, a handle surface, and a dispenser mount fascia surface.

18. The refrigerator of claim 16, wherein the lighting intensity or visible light color of the at least one dispenser lighting device associated with the dispenser is altered based upon feedback from at least one dispenser proximity sensor and the environmental sensor.

19. The refrigerator of claim 14, wherein the at least one dispenser proximity sensor, the at least one door proximity sensor, and the at least one interior proximity sensor include both capacitive sense sensors and infrared light sensors.

20. The refrigerator of claim 14, wherein a predefined subvolume is a drawer within the interior of the refrigerator where the lighting intensity of a light illuminating the drawer provided by the interior lighting device associated with the drawer is altered upon sensing of motion by an interior proximity sensor associated with the drawer and wherein the refrigerator further comprises a time sensor which after a predetermined amount of time has passed, causes the at least one exterior refrigerator lighting device associated with the door to flicker or pulse on and off thereby allowing a user that the drawer was left open.

\* \* \* \* \*